Figure 1:

W. H. GREGG.
ARTIFICIAL WORM-BAIT FOR FISHING.

No. 185,914. Patented Jan. 2, 1877.

ATTEST:
Robt. Burns.
H. Hutchins.

INVENTOR:
William H. Gregg
By Knight Bro.
Attys.

UNITED STATES PATENT OFFICE.

WILLIAM H. GREGG, OF ST. LOUIS, MISSOURI.

IMPROVEMENT IN ARTIFICIAL WORM-BAIT FOR FISHING.

Specification forming part of Letters Patent No. 185,914, dated January 2, 1877; application filed January 21, 1876.

*To all whom it may concern:*

Be it known that I, W. H. GREGG, of the city and county of St. Louis, and State of Missouri, have invented a new and useful Improvement in Artificial Bait for Angling, which improvement is fully set forth in the following specification, reference being had to the accompanying drawing.

My improvement consists of an artificial hook-bait of rubber or other suitable flexible material made in form and color to imitate the ordinary earth-worm.

The figure represents one of my improved artificial earth-worms applied to a hook.

A is the fish-hook, which is introduced to show the artificial bait in condition for use. B is the bait. In the figure the bait consists of a tubular piece of india-rubber made in form and color to represent the common earth-worm. The point of the hook is inserted at one end, and the hook-point may be carried completely through the axial channel and project from the bait, or the bait may be looped upon the hook, as shown, or put upon the hook in any other way.

The imitation should be such as to attract the fish, and it is desirable that it should be of material that is flexible and readily perforated, so that it may be capable of easy impalement upon the hook.

What I claim as an improvement in artificial bait for angling, and desire to secure by Letters Patent, is—

An imitation earth-worm made of india-rubber or other flexible material, as herein set forth.

WILLIAM H. GREGG.

Witnesses:
  SAML. KNIGHT,
  ROBERT BURNS.